United States Patent Office 3,751,516
Patented Aug. 7, 1973

3,751,516
PREPARATION OF PROPYLENE FROM
NORMAL BUTANE
Kenneth J. Frech, Tallmadge, Frederic H. Hoppstock, Akron, and Jeffrey A. Goodwin, Tallmadge, Ohio, assignors to The Goodyear Tire & Rubber Company, Akron, Ohio
No Drawing. Continuation of abandoned application Ser. No. 859,164, Sept. 18, 1969. This application June 21, 1971, Ser. No. 155,295
Int. Cl. C07c 3/28; C10g 11/06
U.S. Cl. 260—683 R                              6 Claims

ABSTRACT OF THE DISCLOSURE

There is disclosed a method of preparing propylene by pyrolyzing n-butane in the presence of a homogeneous catalyst system. Among the examples of the homogeneous catalyst disclosed is hydrogen sulfide, methyl mercaptan, ammonium hydrosulfide, ammonium bromide and ammonium sulfide.

RELATED APPLICATION

This application is a continuation of Ser. No. 859,164 filed Sept. 18, 1969 and now abandoned.

BACKGROUND OF THE INVENTION

This invention is directed to a synthetic method for preparing propylene from normal butane.

Propylene used for industrial chemicals is usually obtained by isolation from a hydrocarbon stream as byproduct propylene. A very small amount is obtained by directly synthesizing propylene.

The major source of byproduct propylene comes from catalytic cracking and reforming operations in refining operations aimed at making gasoline. This propylene must be recovered from low boiling hydrocarbon streams. Thus, it involves low temperature distillation, scrubbing to remove certain impurities, gas compression and the like. The economics of such propylene manufacture is related not only to the physical steps needed to recover and concentrate it, but also to the refiners need for it in the preparation of gasoline. This is so because propylene is used to make alkylate gasoline as well as polymer gasoline. Thus, when all of these factors are considered, the cost of refinery propylene depends on the interplay of the industrial chemical demand for byproduct propylene and the economics of gasoline manufacture.

Another source of byproduct propylene is naphtha cracking where the aim of the naphtha cracking is primarily production of ethylene. This method, of course, ties the price and availability of byproduct propylene to that of ethylene. The purity from this source is generally 90% or better, the primary contaminant being propane. This source of byproduct propylene, too, can be rather expensive.

Another source of byproduct propylene is from pyrolysis of propane which is primarily aimed at ethylene manufacture and this process usually produces very little propylene.

Certain other methods are known for producing synthetic propylene which are aimed primarily at propylene production. One such method is the dehydrogenation of propane using heterogeneous catalyst systems. This process produces synthetic propylene of high purity, but is somewhat unattractive because of high costs. The capital investment of such a process is high due to the cyclic nature of the process involving catalyst regeneration. The dehydrogenation of propane to synthetic propylene is also expensive due to the necessary high dilution of the hydrocarbon in the reactor or the low partial pressure in the reactor. This high dilution results in high steam requirements, resulting in increased utility cost. If the process is conducted at low partial pressure involving a diluent, such as steam, the reactor must be much larger and this increases the capital investment as well as the operating cost.

The thermodynamics of dehydrogenating propane to propylene are unfavorable, thus, low conversion operations are indicated resulting in excessive recycling of unreacted propane. This requirement for large amounts of recycling also increases the operating and initial investment cost. As a rule, these processes employ catalysts that deactivate rather rapidly and result in a catalyst which, upon repeated reactivation or regeneration, will finally become useless. Thus, this results in a high catalyst cost.

Another method proposed for making synthetic propylene is the thermal cracking of isobutane. This process is also somewhat costly but is of present interest due to an increasing shortage of propylene. The decomposition of isobutane leads to approximately equal molar quantities of propylene and isobutylene and unless one has a ready use of the byproduct isobutylene, the resulting propylene will be rather expensive.

It is, therefore, the object of this invention to provide a low cost process for the manufacture of synthetic propylene. Other objects will be apparent as the description proceeds.

This invention, as opposed to certain of the prior art processes for synthetic propylene, which use heterogeneous or fixed bed catalysts, is one which relates to the homogeneous catalysis of the pyrolysis of normal butane. Thus, one could define the invention as a process for preparing propylene which comprises the pyrolysis of normal butane employing a homogeneous catalyst system.

The homogeneous catalysts which are employed to produce propylene by the pyrolysis of normal butane are those materials which, when added to the feedstock, enhance the pyrolysis to form propylene. They must be materials which produce propylene in good yields and produce propylene in good selectivities. They also must be readily available and must be fairly inexpensive. Representative of the homogeneous catalysts useful in this invention are: hydrogen sulfide, methyl mercaptan, ethyl mercaptan, alkyl sulfides, other alkyl mercaptans, bromine, ammonium bromide, hydrogen bromide, methylene chloride, ammonium hydrosulfide, ammonium sulfide, and ammonium polysulfide. Also useful are the reaction product of one mole of hydrogen sulfide with at least one mole of an amine. Representative of this class of materials are methylamine hydrosulfide resulting from one mole of hydrogen sulfide and one mole of methylamine. When two moles of methylamine are reacted with one mole of hydrogen sulfide, methylamine sulfide is formed.

The pyrolysis of normal butane in the presence of a homogeneous catalyst to form propylene is straightforward and requires no special techniques. For instance, temperatures ranging from about 500° C. to about 900° C. may be employed in this pyrolysis process. A more preferred range of temperature is from about 600° C. to about 800° C. with about 625° C. to about 725° C. being more preferred. The residence time in the reactor may vary from about 0.01 to about 10 seconds with even shorter times such as 0.2 to about 5 seconds being more preferred and even from 0.5 to about 2.5 seconds being most preferred. The pressures at which the pyrolysis of this invention is conducted can vary widely from a subatmospheric pressure of 10 mm. Hg or lower to about 500 pounds per square inch gauge (p.s.i.g.), pressure ranging from 100 mm. Hg to 200 p.s.i.g. being more preferred and 200 mm. Hg to about 150 p.s.i.g. being most preferred.

A diluent may be employed but it is not necessary. Examples of suitable diluents are steam, nitrogen, methane and other inert gases. When a diluent is employed, the mole ratio of diluent to normal butane may vary from 0 to 25 or more. However, it should be understood that the larger the amount of diluent the more expensive the process becomes due to the heat requirements.

The amount of homogenous catalysts employed in the pyrolysis of n-butane employed in this invention may vary widely from about 0.1 to 100 mole percent catalyst based on the amount of n-butane. As can be seen from the following examples, small amounts, such as about 5 to larger amounts of about 10 mole percent, give good results; however, a more preferred range is from 1 to 50 mole percent, with 2 to 25 mole percent being most preferred.

The practice of this invention is further illustrated by reference to the following examples which are intended to be representative rather than restrictive of the scope of this invention.

EXAMPLES

These examples, which were continuous, were run in a small pyrolysis reactor equipped with an automatic temperature sensing and control device. There were two preheaters employed, ahead of the reactor, one for the diluent which was steam, and one for the n-butane.

The procedure employed was to determined the desired temperature and residence time and set the flow rates of both the diluent and the n-butane to give the desired residence time and ratio to each other. The reactor temperature control was then set at the desired temperature and the desired temperature and the two preheaters were then set at temperatures to maintain the proper temperature of the mixture in the pyrolysis reactor. The temperature of both preheaters and the reactor was switched to automatic control based on internal thermocouple sensing and allowed to arrive at the on-stream conditions. After the desired on-stream conditions were obtained, the product was directed into the receiver vessel and analyzed by conventional vapor phase chromatographic and mass spectographic techniques. In Table 1 is reported a series of continuous experiments wherein n-butane was pyrolyzed with and without a homogeneous catalyst at conversions varying from about 19 to about 62 percent. In Table 1, column 1 is the experiment number; column 2 is the pyrolysis temperature in degrees centigrade; column 3 is the residence time in seconds; column 4 is the amount of homogeneous catalyst, if any, reported in mole percent based on amount of n-butane; column 5 is the conversion i.e. the amount in mole percent of n-butane converted per pass; column 6 is the propylene yield in mole percent based on n-butane charged; and column 7 is the mole percent selectivity to propylene employing conventional recycle techiques.

TABLE 1

| Run No. | Temp., °C. | Time, seconds | Catalyst, mole percent | Mole percent | | |
|---|---|---|---|---|---|---|
| | | | | Conversion | Yield | Selectivity |
| 1 | 700 | 1.02 | None | 36.5 | 19.8 | 54.2 |
| 2 | 700 | 0.92 | H$_2$S, 10.0 | 62.1 | 41.2 | 66.3 |
| 3 | 675 | 1.03 | None | 28.2 | 16.2 | 57.6 |
| 4 | 675 | 1.18 | H$_2$S, 10.0 | 52.3 | 35.9 | 68.9 |
| 5 | 675 | 0.94 | H$_2$S, 10.0 | 47.8 | 33.1 | 69.4 |
| 6 | 675 | 1.20 | None | 33.9 | 16.1 | 48.0 |
| 7 | 650 | 1.54 | do | 19.2 | 10.0 | 52.3 |
| 8 | 650 | 1.42 | H$_2$S, 10.0 | 35.2 | 25.5 | 72.6 |

The role ratio of diluent, which was steam, to n-butane was approximately 3/1.

In experiments reported in Table 2, the conversion was somewhat higher and varied from about 55 to about 75.

TABLE 2

| Run No. | Temp., °C. | Time, seconds | Catalyst, mole percent | Mole percent | | |
|---|---|---|---|---|---|---|
| | | | | Conversion | Yield | Selectivity |
| 1 | 675 | 1.44 | H$_2$S, 5.0 | 49.5 | 31.3 | 63.6 |
| 2 | 675 | 1.32 | H$_2$S, 10.0 | 55.1 | 37.4 | 68.0 |
| 3 | 675 | 1.85 | H$_2$S, 10.0 | 59.4 | 38.3 | 64.7 |
| 4 | 700 | 0.92 | H$_2$S, 10.0 | 62.0 | 41.2 | 66.7 |
| 5 | 725 | 0.80 | H$_2$S, 10.0 | 75.5 | 48.1 | 63.8 |
| 6 | 700 | 0.99 | (NH$_4$)$_2$S, 10.0 | 56.7 | 36.0 | 63.5 |
| 7 | 750 | 0.50 | None | 62.0 | 36.5 | 50.5 |

The mole ratio of diluent, which was steam, to n-butane was 3/1.

While the above examples do employ a diluent, it has been determined that excellent results are obtained when no diluent is employed. Of course, the use of no diluent results in even lower costs.

While certain representative embodiments and details have been shown for the purpose of illustrating the invention, it will be apparent to those skilled in this art that various changes and modifications may be made therein without departing from the spirit or scope of the invention.

What is claimed is:

1. A process for producing propylene which comprises demethanating normal butane by continuously pyrolyzing normal butane at temperatures ranging from about 500° C. to about 900° C. for times ranging from about 0.2 to about 5 seconds and at pressures ranging from about 10 mm. Hg to 500 p.s.i.g., while the normal butane is in the presence of, as the sole catalyst, a homogeneous catalyst selected from the group consisting of ammonium bromide, ammonium sulfide, ammonium hydrosulfide and ammonium polysulfide, said homogeneous catalyst being employed in amounts ranging from 2 to about 25 mole percent based on the amount of n-butane.

2. The process according to claim 1 in which the homogenous catalyst is ammonium bromide.

3. The process according to claim 1 in which the homogeneous catalyst is ammonium sulfide.

4. The process according to claim 1 in which the homogeneous catalyst is ammonium hydrosulfide.

5. The process according to claim 1 in which the homogeneous catalyst is ammonium polysulfide.

6. The process according to claim 1 in which the temperature ranges from about 600° C. to about 800° C.

References Cited

UNITED STATES PATENTS

| 2,415,477 | 2/1947 | Folkins et al. | 260—683 |
| 3,366,703 | 1/1968 | Frech | 260—680 |
| 2,397,638 | 4/1946 | Bell et al. | 260—683 |

DELBERT E. GANTZ, Primary Examiner

G. E. SCHMITKONS, Assistant Examiner

U.S. Cl. X.R.

208—113, 115; 260—677 XA, 683.3